US012762014B2

(12) United States Patent
Huang et al.

(10) Patent No.: US 12,762,014 B2
(45) Date of Patent: Oct. 13, 2026

(54) ECS CIRCUIT AND METHOD, AND MEMORY

(71) Applicant: CXMT CORPORATION, Hefei (CN)

(72) Inventors: Zequn Huang, Hefei (CN); Kai Sun, Hefei (CN)

(73) Assignee: CXMT Corporation, Hefei (CN)

( * ) Notice: Subject to any disclaimer, the term of this patent is extended or adjusted under 35 U.S.C. 154(b) by 22 days.

(21) Appl. No.: 18/822,292

(22) Filed: Sep. 2, 2024

(65) Prior Publication Data

US 2024/0419538 A1 Dec. 19, 2024

Related U.S. Application Data

(63) Continuation of application No. PCT/CN2022/127048, filed on Oct. 24, 2022.

(30) Foreign Application Priority Data

Oct. 8, 2022 (CN) ......................... 202211222144.2

(51) Int. Cl.
*G06F 11/00* (2006.01)
*G06F 11/10* (2006.01)

(52) U.S. Cl.
CPC .................................. *G06F 11/106* (2013.01)

(58) Field of Classification Search
CPC ............... G06F 11/106; G06F 11/0784; G06F 11/0787; G06F 11/076; G06F 11/0766
See application file for complete search history.

(56) References Cited

U.S. PATENT DOCUMENTS

2020/0210278 A1 7/2020 Rooney et al.
2021/0141687 A1* 5/2021 Song .................. G06F 11/1048
(Continued)

FOREIGN PATENT DOCUMENTS

CN 107924705 A 4/2018
CN 112783686 A 5/2021
(Continued)

OTHER PUBLICATIONS

Communication pursuant to Article 94(3) EPC issued in European corresponding application No. 22 961 264.3 mailed on Mar. 23, 2026, 6 pages.
(Continued)

*Primary Examiner* — Joseph D Manoskey
(74) *Attorney, Agent, or Firm* — Intellectual Valley Law, P.C.

(57) ABSTRACT

The ECS circuit includes an ECS control module, a command generation module, an address counting module, and an error tracking and recording module. The ECS control module is configured to: receive a mode control signal, and generate an ECS command signal based on the mode control signal. The command generation module is configured to generate an internal command signal based on the ECS command signal. The internal command signal is configured to perform a corresponding ECS operation. The address counting module is configured to: perform address counting based on the internal command signal, and generate a counting end signal when counting is completed for a target address. The error tracking and recording module is configured to: receive an error signal, and generate an error tracking signal based on the counting end signal and the error signal. The error tracking signal is configured to record error information of the ECS operation.

19 Claims, 7 Drawing Sheets

(56) References Cited

U.S. PATENT DOCUMENTS

| | | | | |
|---|---|---|---|---|
| 2021/0142860 | A1 | 5/2021 | Song et al. | |
| 2022/0068363 | A1* | 3/2022 | Lee | G11C 11/40626 |
| 2024/0211344 | A1* | 6/2024 | Bains | G06F 11/106 |
| 2025/0117288 | A1* | 4/2025 | Song | G06F 11/106 |
| 2025/0307047 | A1* | 10/2025 | Utesheva | G06F 11/076 |

FOREIGN PATENT DOCUMENTS

| | | | |
|---|---|---|---|
| CN | 113393890 | A | 9/2021 |
| KR | 20210141687 | A | 11/2021 |
| KR | 20220068363 | A | 5/2022 |

OTHER PUBLICATIONS

Second Office Action in the Korean Patent Application No. 20247027944, dated May 27, 2026; English translation attached.

First Office Action in the India Patent Application No. 202417073231, dated Jul. 20, 2026; English translation attached.

* cited by examiner

ECS CIRCUIT AND METHOD, AND MEMORY

CROSS-REFERENCE TO RELATED APPLICATIONS

This is a continuation of International Patent Application No. PCT/CN2022/127048 filed on Oct. 24, 2022, which claims priority to Chinese Patent Application No. 202211222144.2, filed on Oct. 8, 2022. The disclosure of these applications is hereby incorporated by reference in their entireties.

BACKGROUND

With the continuous development of semiconductor technologies, increasingly high requirements are put forward for a data transmission speed in the manufacturing and use of devices such as computers. To achieve faster data transmission speeds, a series of devices such as memories capable of transmitting data at a double data rate (DDR) have emerged.

However, as a transmission speed of the memory becomes faster, size of the memory cell shrinks, row hammer occurs, errors may be introduced in the memory. Therefore, error check needs to be performed on the memory and a checked error needs to be corrected in a timely manner. A dynamic random access memory (DRAM) is taken as an example. Complete error check and scrub (ECS) needs to be performed on the DRAM at least once every 24 hours.

SUMMARY

The present disclosure relates to the field of semiconductor technologies, and in particular, to an ECS circuit and method, and a memory.

According to a first aspect, an embodiment of the present disclosure provides an ECS circuit, including an ECS control module, a command generation module, an address counting module, and an error tracking and recording module.

The ECS control module is configured to: receive a mode control signal, and generate an ECS command signal based on the mode control signal.

The command generation module is configured to generate an internal command signal based on the ECS command signal. The internal command signal is configured to perform a corresponding ECS operation.

The address counting module is configured to: perform address counting based on the internal command signal, and generate a counting end signal when counting is completed for a target address.

The error tracking and recording module is configured to: receive an error signal, and generate an error tracking signal based on the counting end signal and the error signal. The error tracking signal is configured to record error information of the ECS operation.

In some embodiments, the mode control signal includes a multi-purpose command MPC signal or a refresh command signal.

The ECS control module is further configured to generate the ECS command signal based on the MPC signal when the ECS operation is in a manual ECS operation mode; or the ECS control module is further configured to generate the ECS command signal based on the refresh command signal when the ECS operation is in an automatic ECS operation mode.

In some embodiments, the ECS control module includes a first timing module and a command control module.

The first timing module is configured to generate an ECS flag signal.

The command control module is configured to: receive the ECS flag signal, obtain the refresh command signal when the ECS flag signal is in a valid state, and generate the ECS command signal based on the refresh command signal.

In some embodiments, the first timing module is configured to: receive a first clock signal, perform counting based on the first clock signal, generate the ECS flag signal, and send the ECS flag signal to the command control module. The ECS flag signal is in a valid state when a count value meets a preset condition.

In some embodiments, the first timing module is further configured to stop the counting when the ECS flag signal is in a valid state.

The command control module is further configured to: generate a reset signal after the ECS command signal is generated based on the refresh command signal, and send the reset signal to the first timing module, so that the first timing module starts counting again and controls the ECS flag signal to be in an invalid state.

In some embodiments, the command control module is further configured to output the received refresh command signal as an internal refresh signal when the ECS flag signal is in an invalid state, so as to perform a refresh operation.

In some embodiments, the command generation module includes an internal command generation module and a second timing module.

The internal command generation module is configured to successively generate an active signal, a read command signal, a write command signal, and a precharge signal based on a preset timing condition after the ECS command signal is received.

The second timing module is configured to: control a time interval between the active signal and the read command signal to meet a first timing condition, control a time interval between the read command signal and the write command signal to meet a second timing condition, and control a time interval between the write command signal and the precharge signal to meet a third timing condition.

The preset timing condition includes the first timing condition, the second timing condition, and the third timing condition.

In some embodiments, the ECS circuit further includes a memory control module and a memory array, the memory array includes at least one bank group, the bank group includes at least one bank, and the bank includes at least one row and at least one column.

The memory control module is configured to: receive the internal command signal, and perform an ECS operation on the memory array based on the internal command signal.

The memory control module is further configured to: generate the error signal if error information is detected when the ECS operation is performed, and send the error signal to the error tracking and recording module.

In some embodiments, the address counting module includes a column counting module, a row counting module, and an array counting module.

The column counting module is configured to: receive the precharge signal, perform column counting on a target row based on the precharge signal, and generate a column output signal and a column end signal when column counting is completed for the target row.

The row counting module is configured to: receive the precharge signal and the column output signal, perform row counting on a target bank based on the precharge signal and the column output signal, and generate a row output signal and a row end signal when row counting is completed for the target bank.

The array counting module is configured to: receive the precharge signal and the row output signal, perform bank counting on a target bank group based on the precharge signal and the row output signal, generate a bank output signal and a bank end signal when the bank counting is completed for the target bank group, perform bank group counting on the memory array based on the precharge signal and the bank output signal, and generate a bank group end signal and an ECS end signal when bank group counting is completed for the memory array.

In some embodiments, the array counting module includes a bank counting module and a bank group counting module.

The bank counting module is configured to: receive the precharge signal and the row output signal, perform bank counting on the target bank group based on the precharge signal and the row output signal, and generate the bank output signal and the bank end signal when bank counting is completed for the target bank group.

The bank group counting module is configured to: receive the precharge signal and the bank output signal, perform bank group counting on the memory array based on the precharge signal and the bank output signal, and generate the bank group end signal and the ECS end signal when bank group counting is completed for the memory array.

In some embodiments, the column counting module is further configured to continue to perform column counting on a next target row after the column output signal and the column end signal are generated, until column counting is completed for each row in the memory array.

The row counting module is further configured to continue to perform row counting on a next target bank after the row output signal and the row end signal are generated, until row counting is completed for each bank in the memory array.

The array counting module is further configured to continue to perform bank counting on a next target bank group after the bank output signal and the bank end signal are generated, until bank counting is completed for each bank group in the memory array.

In some embodiments, the error tracking and recording module includes a first error tracking and recording module.

The first error tracking and recording module is configured to: receive a counting mode signal, and determine that a counting mode of the first error tracking and recording module is a codeword counting mode when the counting mode signal has a first value, or determine that a counting mode of the first error tracking and recording module is a row counting mode when the counting mode signal has a second value.

In some embodiments, the first error tracking and recording module is configured to: receive the error signal when the counting mode is the codeword counting mode, perform codeword counting based on the error signal, determine a first count value when the ECS end signal is received, compare the first count value with a first threshold, and store the first count value when the first count value is greater than or equal to the first threshold. The first count value is configured to represent a quantity of codewords having error information in the memory array.

In some embodiments, the first error tracking and recording module is configured to: receive the error signal and the column end signal when the counting mode is the row counting mode, perform error row counting based on the error signal and the column end signal, determine a second count value when the ECS end signal is received, compare the second count value with a second threshold, and store the second count value when the second count value is greater than the second threshold. The second count value is configured to represent a quantity of rows having at least one piece of error information in the memory array.

In some embodiments, the error tracking and recording module further includes a second error tracking and recording module.

The second error tracking and recording module is configured to: receive the error signal, count error information of the target row based on the error signal and the column end signal, compare a third count value of the target row with a target count value stored in a first register module after the third count value is determined, clear the target count value stored in the first register module if the third count value is greater than the target count value, store the third count value as the target count value in the first register module, continue to perform error counting on a next target row based on the error signal and the column end signal, until the ECS end signal is received, and then determine the target count value stored in the first register module. The third count value is configured to represent a quantity of codewords having error information in the target row.

In some embodiments, the second error tracking and recording module is further configured to store address information corresponding to the target count value into a second register module when the target count value is stored into the first register module. The address information includes row address information, bank address information, and bank group address information corresponding to the target count value.

In some embodiments, the second error tracking and recording module is further configured to: compare a target count value currently stored in the first register module with a third threshold after the ECS end signal is received, and retain the target count value stored in the first register module and the address information stored in the second register module if the target count value is greater than or equal to the third threshold, or clear the target count value stored in the first register module and the address information stored in the second register module if the target count value is less than the third threshold.

According to a second aspect, an embodiment of the present disclosure provides an ECS method. The method is applied to the ECS circuit according to the first aspect, and the method includes the steps as follows.

A mode control signal is received by the ECS control module, and an ECS command signal is generated based on the mode control signal.

The ECS command signal is received by the command generation module, and an internal command signal is generated based on the ECS command signal. The internal command signal is configured to perform a corresponding ECS operation.

The internal command signal is received by the address counting module, address counting is performed based on the internal command signal, and a counting end signal is generated when counting is completed for a target address.

The counting end signal and an error signal are received by the error tracking and recording module, and an error tracking signal is generated based on the counting end signal and the error signal. The error tracking signal is configured to record error information of the ECS operation.

According to a third aspect, an embodiment of the present disclosure provides a memory. The memory includes the ECS circuit according to the first aspect.

The embodiments of the present disclosure provide an ECS circuit and method, and a memory. The ECS circuit includes an ECS control module, a command generation module, an address counting module, and an error tracking and recording module. The ECS control module is configured to: receive a mode control signal, and generate an ECS command signal based on the mode control signal. The command generation module is configured to generate an internal command signal based on the ECS command signal. The internal command signal is configured to perform a corresponding ECS operation. The address counting module is configured to: perform address counting based on the internal command signal, and generate a counting end signal when counting is completed for a target address. The error tracking and recording module is configured to: receive an error signal, and generate an error tracking signal based on the counting end signal and the error signal. The error tracking signal is configured to record error information of the ECS operation. In this way, in the embodiments of the present disclosure, the ECS command signal is generated based on the mode control signal, to perform the ECS operation, so that complete error check and scrub can be performed on a memory. In addition, the error tracking signal may be further generated based on the error signal and the counting end signal after the ECS operation is completed, to record the error information of the ECS operation. Therefore, a location having error information in the memory can be quickly found and repair can be performed, thereby finally improving performance of the memory.

DESCRIPTION OF EMBODIMENTS

Figure 1:
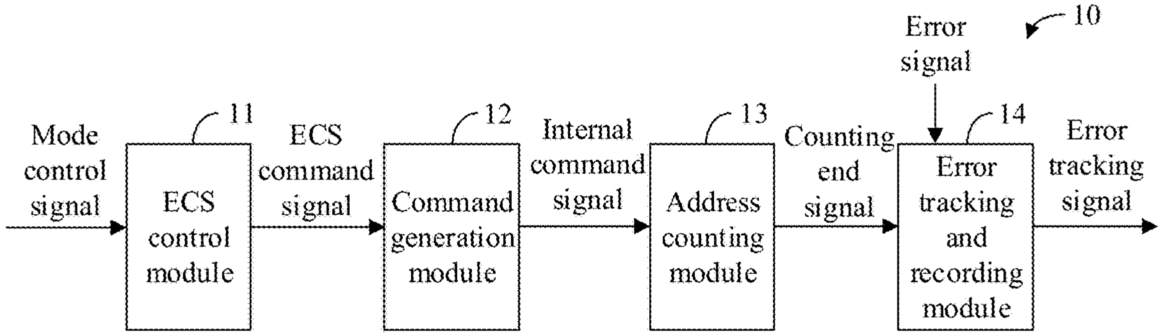
FIG. 1 is a schematic diagram of structural composition of an ECS circuit according to an embodiment of the present disclosure.

The following clearly describes the technical solutions in the embodiments of the present disclosure with reference to the accompanying drawings in the embodiments of the present disclosure. It may be understood that a specific embodiment described herein is merely intended to explain related disclosure, but is not intended to limit the present disclosure. In addition, it should be further noted that, for ease of description, only a part related to the related disclosure is shown in the accompanying drawings.

Unless otherwise defined, all technical and scientific terms used herein have the same meaning as generally understood by a person skilled in the technical field of the present disclosure. The terms used herein are merely intended to describe the embodiments of the present disclosure, and are not intended to limit the present disclosure.

The following description relates to "some embodiments" describing a subset of all the possible embodiments. However, it may be understood that "some embodiments" may be the same or different subsets of all the possible embodiments, and may be combined with each other in the case of no conflict.

It should be noted that the term "first/second/third" in the embodiments of the present disclosure is merely intended to distinguish between similar objects, and does not represent specific sorting for the objects. It may be understood that "first/second/third" may be interchanged for a specific sequence or order if allowed, so that the embodiments of the present disclosure described herein can be implemented in a sequence other than those shown or described herein.

Before the embodiments of the present disclosure are further described in detail, nouns and terms in the embodiments of the present disclosure are first described. The nouns and the terms in the embodiments of the present disclosure are applicable to the following explanations:

dynamic random access memory (DRAM);

double data rate (DDR);

fifth-generation DDR specification (DDR5 SPEC);

multi-purpose command (MPC);

error check and scrub (ECS);

mode register (MR);

automatic refresh (REFab);

self refresh (Self_REF or SREF);

error check and correction (ECC).

A DDR5 DRAM is taken as an example. An ECS mode allows the DRAM to perform internal read, modify a detected mistaken codeword, write corrected data back to a memory array, and record an error count. The ECS mode requires that complete error check and scrub is performed on the DRAM at least once every 24 hours. The ECS operation mode includes automatic and manual operation modes, and may be selected through a mode register signal MR14 OP[7]. An ECS command signal can be obtained with the help of a refresh command signal and a self refresh command signal when an automatic ECS operation is performed. An MPC signal is required when a manual ECS operation is performed. In addition, MR15 can further determine whether to perform the manual ECS operation during self refresh.

To implement functions, e.g. perform error check and scrub and record detected error information, the embodiments of the present disclosure provide an ECS circuit including an ECS control module, a command generation module, an address counting module, and an error tracking and recording module. The ECS control module is configured to: receive a mode control signal, and generate an ECS command signal based on the mode control signal. The command generation module is configured to generate an internal command signal based on the ECS command signal. The internal command signal is configured to perform a corresponding ECS operation. The address counting module is configured to: perform address counting based on the internal command signal, and generate a counting end signal when counting is completed for a target address. The error tracking and recording module is configured to: receive an error signal, and generate an error tracking signal based on the counting end signal and the error signal. The error tracking signal is configured to record error information of the ECS operation. In this way, in the embodiments of the present disclosure, the ECS command signal is generated based on the mode control signal, to perform the ECS operation, so that complete error check and scrub can be performed on a memory. In addition, the error tracking signal may be further generated based on the error signal and the counting end signal after the ECS operation is completed, to record the error information of the ECS operation. Therefore, a location having error information in the memory can be quickly found and repair can be performed, thereby finally improving performance of the memory.

The embodiments of the present disclosure are described below in detail with reference to the accompanying drawings.

In an embodiment of the present disclosure, FIG. 1 is a schematic diagram of structural composition of an ECS circuit 10 according to an embodiment of the present disclosure. As shown in FIG. 1, the ECS circuit 10 may include an ECS control module 11, a command generation module 12, an address counting module 13, and an error tracking and recording module 14.

The ECS control module 11 is configured to: receive a mode control signal, and generate an ECS command signal based on the mode control signal.

The command generation module 12 is configured to generate an internal command signal based on the ECS command signal. The internal command signal is configured to perform a corresponding ECS operation.

The address counting module 13 is configured to: perform address counting based on the internal command signal, and generate a counting end signal when counting is completed for a target address.

The error tracking and recording module 14 is configured to: receive an error signal, and generate an error tracking signal based on the counting end signal and the error signal. The error tracking signal is configured to record error information of the ECS operation.

It should be noted that this embodiment of the present disclosure relates to an overall framework design of the ECS circuit in an integrated circuit design, and in particular, to a requirement for performing complete error check and scrub on a DRAM at least once every 24 hours in a DRAM DDR5 chip. The overall framework of the ECS circuit is configured to generate the ECS command signal and some internal command signals as well as the error tracking signal, to detect error information and perform error detection and repair for internal read/write. This design can be applied to related circuit executing an ECS function in the DRAM DDR5 chip, but is not limited to this range. This design may be applied to other memory chips, and other internal command generation, timing control, and counting circuits.

It should be further noted that, that the ECS circuit is applied to the DRAM to perform the ECS operation is taken as an example. The ECS circuit provided in this embodiment of the present disclosure may implement error check and scrub on the memory array. In short, functions to be implemented in this embodiment of the present disclosure are as follows: In a manual ECS operation mode and an automatic ECS operation mode, the ECS command signal is generated through a multi-purpose command signal (which may be represented by MPC) or a refresh command signal, and the internal command signal necessary for internally performing the ECS operation is generated, so as to perform complete error check and scrub on the DRAM, and track and record detected error information through another module. The refresh command signal may include a refresh signal (which may be represented by REFab) and a self refresh signal (which may be represented by Self-REF). In this way, in this embodiment of the present disclosure, the ECS command signal may be generated based on the MPC signal or the refresh command signal, or may be generated based on another suitable signal. This is not limited herein.

As shown in FIG. 1, the ECS control module 11 is a module configured to generate the ECS command signal. The DRAM correspondingly performs one ECS operation each time an ECS command signal is generated. Herein, one ECS operation is performed for a storage bit in the memory array. The ECS operation is configured to determine whether a codeword error exists in a detected storage bit, and perform error correction when a codeword error is detected.

For a manner of generating the ECS command signal, in some embodiments, the ECS control module is further configured to: receive an ECS mode selection signal, and determine that the ECS operation mode is the manual ECS operation mode when the ECS mode selection signal has a first value, or determine that the ECS operation is in the automatic ECS operation mode when the ECS mode selection signal has a second value.

In some embodiments, the ECS control module 11 is further configured to generate the ECS command signal based on the MPC signal when the ECS operation is in the manual ECS operation mode; or

- the ECS control module 11 is further configured to: receive a first mode register signal when the ECS operation is in the manual ECS operation mode, and generate the ECS command signal based on the first mode register signal and the refresh command signal; or
- the ECS control module 11 is further configured to generate the ECS command signal based on the refresh command signal when the ECS operation is in the automatic ECS operation mode.

Figure 2:
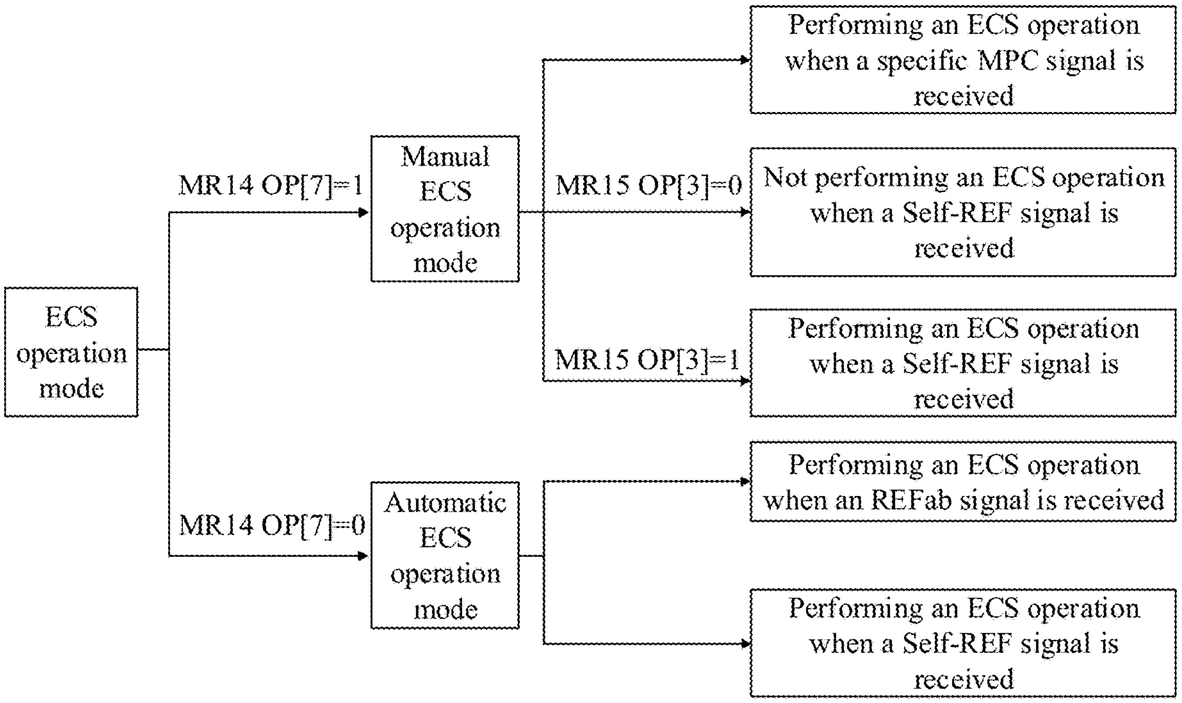
FIG. 2 is a schematic diagram of selecting an ECS operation mode according to an embodiment of the present disclosure.

It should be noted that FIG. 2 is a schematic diagram of selecting an ECS operation mode according to an embodiment of the present disclosure. As shown in FIG. 2, the ECS operation mode includes the manual ECS operation mode and the automatic ECS operation mode, and may be selected based on the ECS mode selection signal. The ECS mode selection signal may be a mode register signal MR14 OP[7]. The DRAM executes the manual ECS operation mode when the MR14 OP[7] is equal to 1. The DRAM executes the automatic ECS operation mode when the MR14 OP[7] is equal to 0. In this embodiment of the present disclosure, 1 represents logic 1 indicating a high level, and 0 represents logic 0 indication a low level.

In the manual ECS operation mode, the ECS control module generates the ECS command signal based on a specific MPC signal when the MPC signal is received, to perform the ECS operation. Herein, the specific MPC signal may be an MPC signal with a value of 00001100.

In addition, in the manual ECS operation mode, whether to perform the ECS operation is further determined based on the refresh command signal and the first mode register signal. In this case, the refresh command signal is a self refresh signal (Self-REF), and the first mode register signal may be a mode register signal MR15 OP[3]. It may be understood that, the DRAM needs to perform a self refresh operation when the Self-REF signal is received. The MR15 OP[3] may be configured to determine whether one ECS operation needs to be performed before the self refresh operation is performed. When the MR15 OP[3] is equal to 1, one ECS operation needs to be performed when self refresh is entered, that is, the ECS control module generates the ECS command signal based on the first mode register signal with a specific bit value of 1 and the Self-REF signal, so as to perform the ECS operation. When the MR15 OP[3] is equal to 0, the ECS operation is not to be performed during self refresh, that is, the ECS control module does not generate the ECS command signal, and the DRAM performs the self refresh operation.

In the automatic ECS operation mode, the refresh command signal includes a self-refresh signal (Self-REF) and a refresh signal (REFab). The ECS command signal may be generated based on the REFab signal when the REFab signal is received, to perform the ECS operation. Alternatively, the ECS command signal may be generated based on the Self-REF signal when self refresh is entered, to perform the ECS operation. An average time interval for performing error check and scrub may be represented by tECSint.

That is, in different ECS operation modes, the ECS command signal may be generated based on different command signals to perform the ECS operation. In the automatic ECS operation mode, an automatic ECS operation may be performed based on the refresh signal (REFab), or an automatic ECS operation is performed based on the self refresh signal (Self_REF). In the manual ECS operation mode, the ECS operation may be performed based on the specific MPC signal, or whether the ECS operation is performed during self refresh is determined in combination with the first mode register signal. In this way, the ECS control module may generate the ECS command signal based on the MPC signal and/or the refresh command signal, to perform the ECS operation, thereby simplifying a procedure required for generating the ECS operation. In addition, the ECS control module may further select different ECS operation modes and determine whether the ECS operation needs to be performed in combination with the mode register signal, thereby increasing flexibility of performing the ECS operation.

Figure 3:
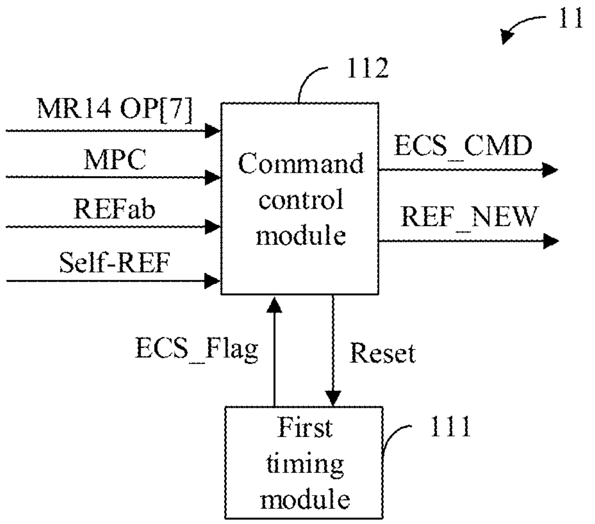
FIG. 3 is a schematic diagram of structural composition of an ECS control module according to an embodiment of the present disclosure.

Further, for composition of the ECS control module, refer to FIG. 3, which is a schematic diagram of structural composition of an ECS control module 11 according to an embodiment of the present disclosure. As shown in FIG. 3, in some embodiments, the ECS control module 11 includes a first timing module 111 and a command control module 112.

The first timing module 111 is configured to generate an ECS flag signal.

The command control module 112 is configured to: receive the ECS flag signal, obtain the refresh command signal when the ECS flag signal is in a valid state, and generate the ECS command signal based on the refresh command signal.

It should be noted that, as shown in FIG. 3, the ECS control module 11 mainly includes the first timing module 111 and the command control module 112. The command control module 112 selects a specific ECS operation mode for execution through the mode register signal MR14 OP[7]. The automatic ECS operation mode is executed when MR14 OP[7]=0, which is also a default mode of the DDR5. The manual ECS operation mode is executed when MR14 OP[7]=1, and a value of the MPC signal needs to be OP[7:0]=00001100.

It should be further noted that, for the DRAM, complete error check and scrub needs to be performed on the entire memory array at least once within 24 hours. Therefore, in the automatic ECS operation mode, the first timing module needs to plan a time interval for ECS, to ensure that error check and scrub is completed for all memory arrays within 24 hours.

That is, in the automatic ECS operation mode, the first timing module 111 may generate the ECS flag signal (represented by ECS_Flag in FIG. 3), and send the signal to the command control module 112. In addition, the ECS_Flag signal is in a valid state at intervals of a preset time period. The command control module 112 receives the ECS_Flag signal, and obtains the refresh command signal when the ECS_Flag signal is in a valid state, to generate the ECS command signal (represented by ECS_CMD in FIG. 3) based on the obtained refresh command signal. The refresh command signal herein may include at least one of the following: the refresh signal (REFab) and the self refresh signal (Self-REF).

For a manner of planning timing by the first timing module, in some embodiments, the first timing module is configured to: receive a first clock signal, perform counting based on the first clock signal, generate the ECS flag signal, and send the ECS flag signal to the command control module. The ECS flag signal is in a valid state when a count value meets a preset condition.

It should be noted that the first timing module may count the first clock signal when timing is planned. ECS_Flag is in a valid state when the count value meets the preset condition. In this case, the command control module 112 obtains the refresh command signal, to generate the ECS command signal configured to instruct to perform the ECS operation. It should be noted that the refresh command signal at this time is a refresh command signal appearing after the count value meets the preset condition. Therefore, compared with a moment at which the count value meets the preset condition, the refresh command signal obtained at this time is specifically a refresh command signal appearing at a next moment, and may also be referred to as a next refresh command signal briefly. In this way, the time interval for the ECS operation is planned based on whether the count value meets the preset condition, so that it can be ensured that complete error check and scrub is performed once within 24 hours.

The first clock signal may be a clock signal with a fixed frequency generated by an oscillator. For example, if a period of the first clock signal is 4.4 microseconds (μs), for a 16 GB memory configuration, to fulfill complete error check and scrub for the DRAM once within 24 hours, the time interval for the ECS operation is 644 μs, and counting needs to be performed approximately 644/4.4=146 times, to indicate that one time of counting is completed. In this case, the count value meets the preset condition. That is, the ECS flag signal in a valid state may be generated when the count value reaches 146.

In some embodiments, the first timing module is further configured to stop the counting when the ECS flag signal is in a valid state.

The command control module is further configured to: generate a reset signal after the ECS command signal is generated based on the refresh command signal, and send the reset signal to the first timing module, so that the first timing module starts counting again and controls the ECS flag signal to be in an invalid state.

It should be noted that in this embodiment of the present disclosure, the ECS_Flag signal may be in a valid state, or may be in an invalid state. The first timing module 111 generates an ECS_Flag signal in a valid state at intervals of a time period, and the signal is configured to generate an ECS command signal. The command control module 112 further generates a reset signal (represented by Reset in FIG. 3) after the ECS command signal is generated, and sends the reset signal to the first timing module 111, so that the ECS_Flag signal is in an invalid state, and the first timing module 111 starts counting again.

In some embodiments, the command control module is further configured to output the received refresh command signal as an internal refresh signal when the ECS flag signal is in an invalid state, so as to perform a refresh operation.

Specifically, a level value of the ECS flag signal may include a first value and a second value. The first value may be logic 1 indicating a high level, and the second value may be logic 0 indicating a low level. Alternatively, the first value may be logic 0 indicating a low level, and the second value may be logic 1 indicating a high level. This is not limited.

For example, it may be determined that the ECS flag signal is in a valid state if the level value of the ECS flag signal is logic 1. Otherwise, it may be determined that the ECS flag signal is in an invalid state if the level value of the ECS flag signal is logic 0.

It should be further noted that in this embodiment of the present disclosure, a refresh command signal received at a next moment may be stolen if the ECS flag signal is in a valid state, and an ECS command signal may be generated based on the refresh command signal. In addition, the corresponding stolen refresh command signal disappears, to perform an ECS operation. The refresh command signal is not to be stolen if the ECS flag signal is in an invalid state, and is directly output as an internal refresh signal, to perform a refresh operation. In FIG. 3, the internal refresh signal is represented by REF_NEW.

That is, the first timing module generates a flag signal ECS_Flag for valid ECS at intervals of a fixed time period, and stops counting for timing. The ECS_Flag signal is transmitted to the command control module. Then, the command control module steals a next REFab signal or Self_REF signal to generate an ECS command signal. In addition, the corresponding stolen refresh command signal disappears. Then, a reset signal is generated and sent to the first timing module, so that the ECS_Flag signal is reset to an invalid value, and the first timing module starts counting again. The refresh command signal is not to be stolen when the ECS_Flag signal has an invalid value. Instead, an REF_NEW signal is directly obtained, so that an ongoing refresh operation is not affected.

In this way, because the command control module 112 "steals" the refresh command signal, that is, when the ECS command signal is generated, the corresponding refresh command signal disappears, and the refresh operation is not to be performed when the ECS operation is performed. In this way, power consumption of a memory can be further reduced when ECS is performed, and a memory fault caused by performing the refresh operation simultaneously when the ECS operation is performed can be further avoided.

Further, as shown in FIG. 1, the ECS control module 11 sends the ECS command signal to the command generation module 12 after the ECS command signal is generated, and the command generation module 12 generates the internal command signal based on the ECS command signal. The internal command signal is a command signal required for performing the ECS operation.

Figure 4:
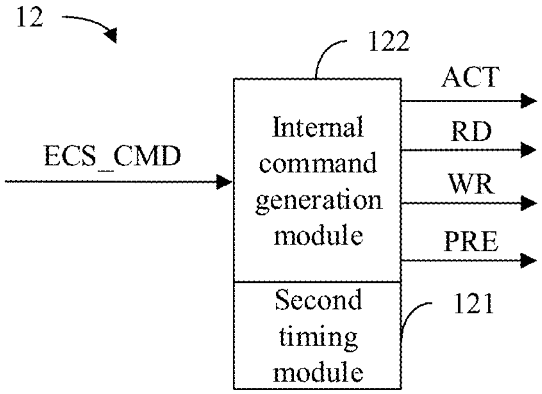
FIG. 4 is a schematic diagram of structural composition of a command generation module according to an embodiment of the present disclosure.

For the command generation module 12, refer to FIG. 4, which is a schematic diagram of structural composition of a command generation module 12 according to an embodiment of the present disclosure. As shown in FIG. 4, in some embodiments, the command generation module 12 includes an internal command generation module 122 and a second timing module 121.

The internal command generation module 122 is configured to successively generate an active signal, a read command signal, a write command signal, and a precharge signal based on a preset timing condition after the ECS command signal is received.

The second timing module 121 is configured to: control a time interval between the active signal and the read command signal to meet a first timing condition, control a time interval between the read command signal and the write command signal to meet a second timing condition, and control a time interval between the write command signal and the precharge signal to meet a third timing condition.

The preset timing condition includes the first timing condition, the second timing condition, and the third timing condition.

It should be noted that the internal command signal may include the active signal (Active, represented by ACT in FIG. 4), the read command signal (Read, represented by RD in FIG. 4), the write command signal (Write, represented by WR in FIG. 4), and the precharge signal (Precharge, represented by PRE in FIG. 4). Specifically, the internal command generation module 122 successively generates the ACT signal, the RD signal, the WR signal, and the PRE signal based on the preset timing condition after the ECS command signal (represented by ECS_CMD in FIG. 4) is received. Timing between internal command signals is controlled by the second timing module 121.

It should be further noted that the time interval between the ACT signal and the RD signal is represented by tRCD, the time interval between the RD signal and the WR signal is represented by WL, and the time interval between the WR signal and the PRE signal is represented by tWR. For example, the internal command generation module first generates the ACT signal after the ECS command signal is received, delays the ACT signal by tRCD under the control of the second timing module 121 to obtain the RD signal, then delays the RD signal by WL under the control of the second timing module 121 to obtain the WR signal, and continues to delay the WR signal by tWR under the control of the second timing module 121 to obtain the PRE signal.

It should be further noted that a main function of the command generation module 12 is as follows: In the automatic ECS operation mode and the manual ECS operation mode, the ECS control module 11 separately controls the MPC signal, the REFab signal, and the Self_REF signal to generate the ECS command signal and send the signal to the command generation module 12. Minimum time required for performing each ECS operation is denoted as tECSc. In this time period, ECS requires internal read/write, error detection, and modification on a column (namely, a specific storage bit in the memory array) in a row in a bank in a bank group controlled by a counting pointer (the counting pointer refers to a clock signal of the address counting module).

Therefore, the internal ACT command signal, RD command signal, WR command signal, and PRE command signal need to be automatically generated, and timing between the command signals meets tRCD, WL, and tWR, so that one ECS operation is completed within tECSc, that is, the sum of tRCD, WL, and tWR is less than (or equal to) tECSc, to ensure that the ECS operation does not time out. Timing control between the command signals may be specifically implemented by a delay line.

Figure 5:
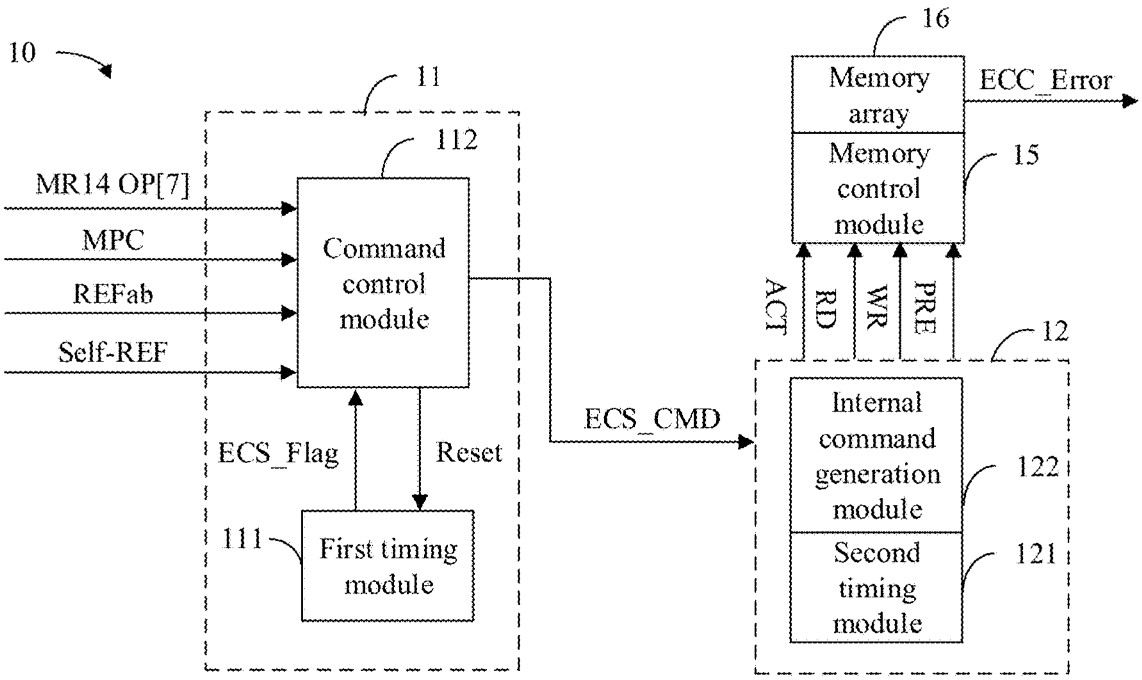
FIG. 5 is a schematic diagram of a partial structure of an ECS circuit according to an embodiment of the present disclosure.

Further, the ECS operation may be implemented by a memory control module by controlling a memory array. FIG. 5 is a schematic diagram of a partial structure of an ECS circuit according to an embodiment of the present disclosure. As shown in FIG. 5, in some embodiments, the ECS circuit 10 further includes a memory control module 15 and a memory array 16. The memory array 16 includes at least one bank group, the bank group includes at least one bank, and the bank includes at least one row and at least one column.

The memory control module 15 is configured to: receive the internal command signal, and perform an ECS operation on the memory array based on the internal command signal.

The memory control module 15 is further configured to: generate the error signal if error information is detected when the ECS operation is performed, and send the error signal to the error tracking and recording module 14.

Figure 6:
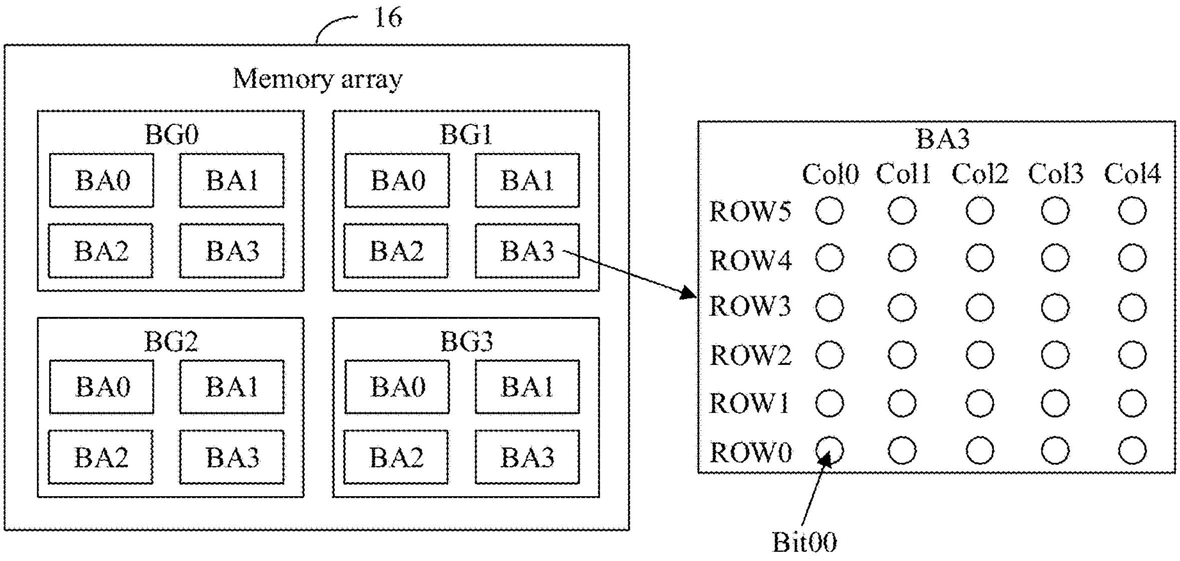
FIG. 6 is a schematic diagram of structural composition of a memory array according to an embodiment of the present disclosure.

It should be noted that in FIG. 5, for descriptions of the ECS control module 11 and the command generation module 12, refer to the foregoing descriptions. Details are not described herein again. For the memory array 16, refer to FIG. 6, which is a schematic diagram of structural composition of a memory array 16 according to an embodiment of the present disclosure. In an example shown in FIG. 6, the memory array 16 (also referred to as an array, DRAM Array) includes four bank groups (BG): BG0, BG1, BG2, and BG3. Each bank group includes four banks (BA): BA0, BA1, BA2, and BA3. BA3 in BG1 is taken as an example. The bank BA3 includes six rows: ROW0, ROW1, ROW2, ROW3, ROW4, and ROW5, and the bank BA3 includes five columns (Col): Col0, Col1, Col2, Col3 and Col4. In FIG. 6, a circle represents a storage bit. For example, in BA3, ROW0 and Cold can be configured to locate a storage bit Bit00. Each ECS operation is performed for a storage bit in the memory array 16.

It should be further noted that the command generation module 12 generates the internal command signal and sends the internal command signal to the memory control module 15 (also referred to as a DRAM control module, DRAM Control). The memory control module 15 performs the ECS operation on the storage bit in the memory array 16 based on the internal command signal.

It should be further noted that the ECS operation may include an activate operation, a read operation, an error correction operation, a write operation, and a precharge operation. The memory control module 15 first receives the ACT signal to activate a word line of a corresponding address, and then receives the RD signal to read a codeword from the storage bit. Herein, the ECS circuit may further include an error correction circuit. The error correction circuit executes an error check and correction (ECC) algorithm. The read codeword is sent to the error correction circuit for verification. The codeword may include at least one data bit and at least one parity check bit, and error correction code may be configured to generate the parity check bit from the data bit. The error correction circuit may check an error of the codeword when the error correction operation is performed, and correct the error of the codeword to generate a corrected codeword. The write operation is performed when the WR signal is received, to write the corrected codeword into the storage bit. In addition, the write operation does not need to be performed if no codeword error is checked. Finally, precharge is performed when the PRE signal is received.

It should be further noted that, an error signal is generated if a codeword having error information is detected when the ECS operation is performed, and is sent to the error tracking and recording module, so that the error tracking and recording module records and tracks the error information. Because the error information is data detected through the error check and correction (ECC) algorithm after data is read from the memory array, the error signal is also referred to as an ECC error signal, and is represented by ECC_Error in FIG. 5.

In this way, in this embodiment of the present disclosure, the internal command signal is generated based on the ECS command signal, and the ECS operation is performed based on the internal command signal, so that error check and scrub can be implemented on the memory array. It should be further noted that the memory array 16 herein may be a memory die in the DRAM. For each die, the ECS operation is performed in a same manner, to implement complete error check and scrub for the DRAM.

The address counting module further performs address counting based on the internal command signal when the memory control module performs the ECS operation on the memory array based on the internal command signal, to generate the counting end signal. Herein, the address counting module performs counting based on the PRE signal, and the PRE signal serves as the clock signal of the address counting module. The address counting module may separately count columns, rows, banks, and bank groups in the memory array, generate the counting end signal when counting is completed, and send the counting end signal to the error tracking and recording module. The counting end signal includes a column end signal indicating that counting is completed for each storage bit in a row, a row end signal indicating that counting is completed for each row in a bank, a bank end signal indicating that counting is completed for each bank in a bank group, a bank group end signal indicating that counting is completed for each bank group in the memory array, and an ECS end signal indicating that counting is completed for all storage bits in the entire memory array. In addition, the address calculation module further sends address information such as column address information, bank information, and bank group information to the error tracking and recording module, so that the error tracking and recording module stores required address information.

Figure 7:
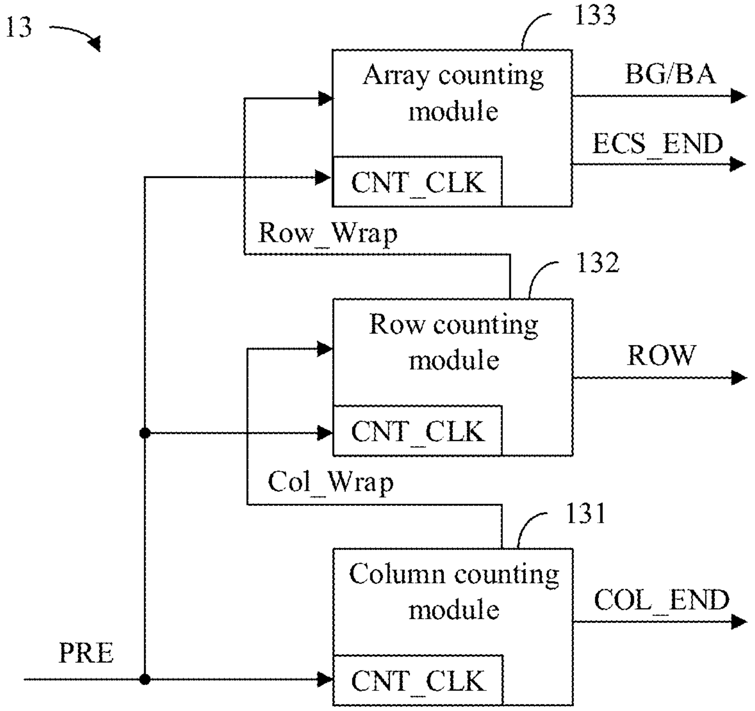
FIG. 7 is a schematic diagram of structural composition of an address counting module according to an embodiment of the present disclosure.

For the address counting module, refer to FIG. 7, which is a schematic diagram of structural composition of an address counting module 13 according to an embodiment of the present disclosure. As shown in FIG. 7, in some embodiments, the address counting module 13 includes a column counting module 131, a row counting module 132, and an array counting module 133.

The column counting module 131 is configured to: receive the precharge signal, perform column counting on a target row based on the precharge signal, and generate a column output signal and a column end signal when column counting is completed for the target row.

The row counting module 132 is configured to: receive the precharge signal and the column output signal, perform row counting on a target bank based on the precharge signal and the column output signal, and generate a row output signal and a row end signal when row counting is completed for the target bank.

The array counting module 133 is configured to: receive the precharge signal and the row output signal, perform bank counting on a target bank group based on the precharge signal and the row output signal, generate a bank output signal and a bank end signal when the bank counting is completed for the target bank group, perform bank group counting on the memory array based on the precharge signal and the bank output signal, and generate a bank group end signal and an ECS end signal when bank group counting is completed for the memory array.

It should be noted that in FIG. 7, PRE represents the precharge signal, Col_Wrap represents the column output signal, COL_END represents the column end signal, Row_Wrap represents the row output signal, ROW represents row address information, BA represents bank address information, BG represents bank group address information, the bank address information and the bank group address information are collectively denoted as BG/BA in FIG. 7, and ECS_END represents the ECS end signal. The address information needs to be sent to the error tracking and recording module 14. In addition, the row end signal (also referred to as ROW_END) represents that row counting is completed in a bank, the bank end signal (also referred to as BA_END) represents that bank counting is completed in a bank group, and the bank group end signal (also referred to as BG_END) represents that counting is completed for all bank groups in the memory array.

It should be further noted that, the memory array 16 shown in FIG. 6 is still taken as an example to describe a working process of the address counting module 13 with reference to FIG. 7. It is assumed that composition of each BA in the memory array 16 is the same as that of BA3 in BG1. In each BG, each storage bit is denoted as a Bitxy, x represents a row in which the storage bit is located in a BA, and y represents a column in which the storage bit is located in the BG. For example, Bit32 represents a storage bit located by ROW3 and Col2 in the BA. A storage bit for which the ECS operation is currently being performed is denoted as a target storage bit, and a row, a bank, and a bank group to which the target storage bit belongs are recorded as a target row, a target bank, and a target bank group. For example, if the ECS operation is being performed for Bit11 in BA2 in BG1, the target row is ROW1 in BA2 in BG1, the target bank is BA2 in BG1, and the target bank group is BG1. Herein, each counting module takes the PRE signal as a clock.

The column counting module 131 may sequentially count storage bits included in each row in the memory array 16. In this way, in one complete ECS process for the memory array 16, the ECS operation is first sequentially performed on each storage bit in the first row ROW0 in BA0 in BG0. When the ECS operation is performed on Bit00, a corresponding PRE signal is sent to a clock terminal (CNT_CLK represents a clock terminal of each counting module in FIG. 7) of the column counting module 131, and a column count value of ROW0 is increased by 1 each time a PRE signal is received. It may be understood that the column count value represents a quantity of storage bits for which the ECS operation has been completed in the target row. Because ROW0 includes five storage bits, it indicates that column counting is completed for ROW0 when the column count value of ROW0 is 5. In this case, the column counting module 131 generates a Col_Wrap signal and a COL_END signal. The Col_Wrap signal is sent to the row counting module 132, and the COL_END signal is sent to the error tracking and recording module. The column counting module 131 resets the count value to zero after column counting is completed for ROW0, then continues to perform column counting on ROW1, and sequentially performs counting on each row in the memory array 16 based on this procedure, until column counting is completed for each row in the memory array 16. That is, the column counting module 131 is further configured to continue to perform column counting on a next target row after the column output signal and the column end signal are generated, until column counting is completed for each row in the memory array.

The row counting module 132 performs counting based on the PRE signal and the Col_Wrap signal. BA0 in BG0 is still taken as an example. Specifically, the column counting module 131 generates a Col_Wrap signal after counting is completed for ROW0, and sends the signal to the row counting module 132. A row counting value of the target bank on which the row counting module 132 performs counting is increased by 1. It may be understood that the row count value represents a quantity of rows for which the ECS operation has been completed in the target bank. The column counting module 131 sends another Col_Wrap signal to the row counting module 132 after counting is completed for ROW1, and the row count value of the target bank continues to be increased by 1. Because BA0 includes six rows, it indicates that row counting is completed for BA0 when the row count value of the target bank is 6. In this case, the row counting module 132 generates a Row_Wrap signal and row address information (ROW). The Row_Wrap signal is sent to a bank counting module 1331, and the row address information is sent to the error tracking and recording module 14. In addition, in a counting process, the row counting module 132 further generates a row end signal (ROW_END) after row counting in the target bank ends, to indicate that row counting is completed for the target bank. The row counting module 132 clears the count value after row counting is completed for BA0, then continues to perform counting on BA1, and sequentially performs counting on each BA in the memory array 16 based on this procedure, until counting is completed for each BA in the memory array 16. That is, the row counting module 132 is further configured to continue to perform row counting on a next target bank after the row output signal and the row end signal are generated, until row counting is completed for each bank in the memory array.

Figure 8:
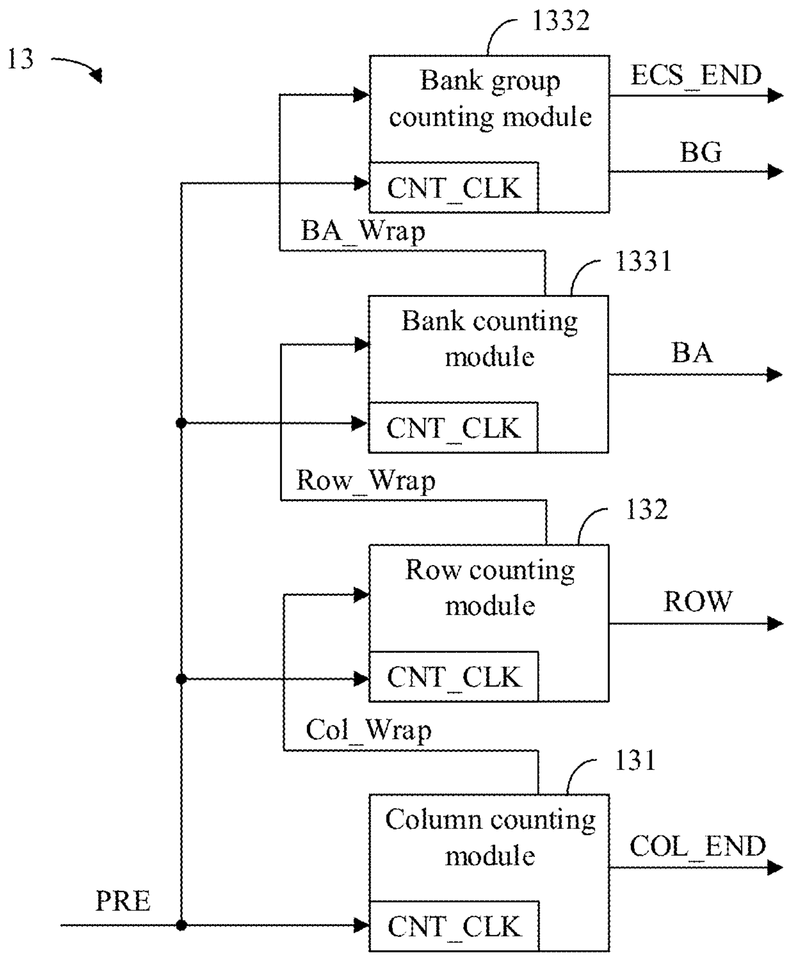
FIG. 8 is a schematic diagram of structural composition of another address counting module according to an embodiment of the present disclosure.

The array counting module 133 counts not only the banks, but also the bank groups. For the array counting module 133, refer to FIG. 8, which is a schematic diagram of structural composition of another address counting module 13 according to an embodiment of the present disclosure. As shown in FIG. 8, in some embodiments, the array counting module includes the bank counting module 1331 and a bank group counting module 1332.

The bank counting module 1331 is configured to: receive the precharge signal and the row output signal, perform bank counting on the target bank group based on the precharge signal and the row output signal, and generate the bank output signal and the bank end signal when bank counting is completed for the target bank group.

The bank group counting module 1332 is configured to: receive the precharge signal and the bank output signal, perform bank group counting on the memory array based on the precharge signal and the bank output signal, and generate the bank group end signal and the ECS end signal when bank group counting is completed for the memory array.

It should be noted that the bank counting module 1331 performs counting based on the PRE signal and the Row_Wrap signal. BG0 is still taken as an example. The row counting module 132 generates a Row_Wrap signal after counting is completed for BA0, and sends the signal to the bank counting module 1331. A bank count value of the target bank group on which the bank counting module 1331 performs counting is increased by 1. It may be understood that the bank count value represents a quantity of banks for which the ECS operation has been completed in the target bank group. The row counting module 132 generates another Row_Wrap signal after counting is completed for BA1, and sends the signal to the bank counting module 1331. The bank count value of the target bank group continues to be increased by 1. Because BG0 includes four BAs, it indicates that bank counting is completed for BG0 when the bank count value of the target bank group is 4. In this case, the bank counting module 1331 generates a BA_Wrap signal and bank address information (BA). The BA_Wrap signal is sent to the bank group counting module 1332, and the bank address information is sent to the error tracking and recording module 14. In addition, in a counting process, the bank counting module 1331 further generates a bank end signal (BA_END) after bank counting in the target bank group ends, to indicate that bank counting is completed in the target bank group. The bank counting module 1331 resets the count value to zero after bank counting is completed for BG0, then continues to perform counting on BG1, and sequentially performs counting on each BG in the memory array 16 based on this procedure, until counting is completed for each BG in the memory array 16. That is, in the array counting module 133, the bank counting module 1331 is further configured to continue to perform bank counting on a next target bank group after the bank output signal and the bank end signal are generated, until bank counting is completed for each bank group in the memory array.

The bank group counting module 1332 performs counting based on the PRE signal and the BA_Wrap signal. The bank counting module 1331 generates a BA_Wrap signal after counting is completed for BG0, and sends the signal to the bank group counting module 1332. A bank group count value is increased by 1. It may be understood that the bank group count value represents a quantity of bank groups for which the ECS operation has been completed in the memory array 16. The bank counting module 1331 generates another BA_Wrap signal after counting is completed for BG1, and sends the signal to the bank group counting module 1332. The bank group count value continues to be increased by 1. Because the memory array 16 includes four BGs, it indicates that bank group counting is completed for the memory array 16 when the bank group count value is 4, that is, the ECS operation is completed for each storage bit in the memory array 16. In this case, the bank group counting module 1332 generates bank group address information (BG) and an ECS_END signal. Both the bank group address information and the ECS_END signal are sent to the error tracking and recording module 14. In addition, in a counting process, the bank group counting module 1332 further generates a bank group end signal (BG_END) after bank group counting in the memory array ends, to indicate that bank group counting is completed in the memory array. The bank group counting module 1332 resets the count value to zero after bank group counting is completed, and continues to perform counting based on the foregoing procedure when a next ECS operation is performed on the memory array 16.

It may be understood that the bank counting module 1331 is configured to perform bank counting on the bank group, the bank group counting module 1332 is configured to count the bank groups in the memory array, and the bank counting module 1331 and the bank group counting module 1332 may be integrated into the array counting module 133 to implement a related function.

It should be further noted that in this embodiment of the present disclosure, each generated output signal and each generated counting signal (or an ECS command signal and the like) may be high-level pulses. That is, the signals are in a valid state when a specific condition is met, so that a corresponding module can generate another signal or perform an operation such as counting, read, or write based on the signals.

That is, a main function of the address counting module (also referred to as an address counter) is as follows: To perform complete error check and scrub on the DRAM, rows and columns in all banks in all bank groups need to be accessed. For each ECS operation, the address counting module increases a count of a column address (namely, a column count of a target row) after each internal PRE command signal is received. A count of a row address (namely, a row count of a target bank) starts to be increased after column address counting is completed for a target row, until all codewords in each row in a bank is accessed. Then, a count of a bank (namely, a bank count of a target bank group) starts to be increased. A process of accessing a codeword in a previous bank is repeated. A count of a bank group (bank group count) starts to be increased when counting is completed for all banks in a bank group, until all banks of the DRAM are accessed. In this case, a complete error check and scrub operation is completed once.

In this way, the PRE command signal existing when the ECS operation is performed serves as a clock of the address counting module, to separately count rows, banks, and bank groups. Therefore, no additional clock is required, and whether the ECS operation is completed for the row, the bank, and the bank group can be accurately determined.

In this way, in this embodiment of the present disclosure, the internal command signal PRE generated by the command generation module serves as the clock signal of the address counting module. A count of the column counting module (also referred to as a column address counter, COL_CNT) starts to be increased each time the ECS operation is performed. A Col_Wrap signal is output as an input to the row counting module (also referred to as a row address counter, ROW_CNT) when column address counting is completed for a row, and a count of the row counting module starts to be increased. Row_Wrap is output as an input to the array counting module (also referred to as a BG/BA counter, BA/BG_CNT) when row address counting is completed for a bank. An ECS_END signal is output when BG/BA counting is completed, to indicate that complete error check and scrub is completed once. A COL_END signal is output to indicate that counting is completed for a row, and is applied to a row mode of an error counter.

The address counting module sends the counting end signal and the address information to the error tracking and recording module, and the error tracking and recording module generates the error tracking signal based on the counting end signal, the address information, and the error signal, to record the error information of the ECS operation. The counting end signal mainly includes the column end signal and the ECS end signal, and the address information mainly includes the row address information, the bank address information, and the bank group address information.

Figure 9:
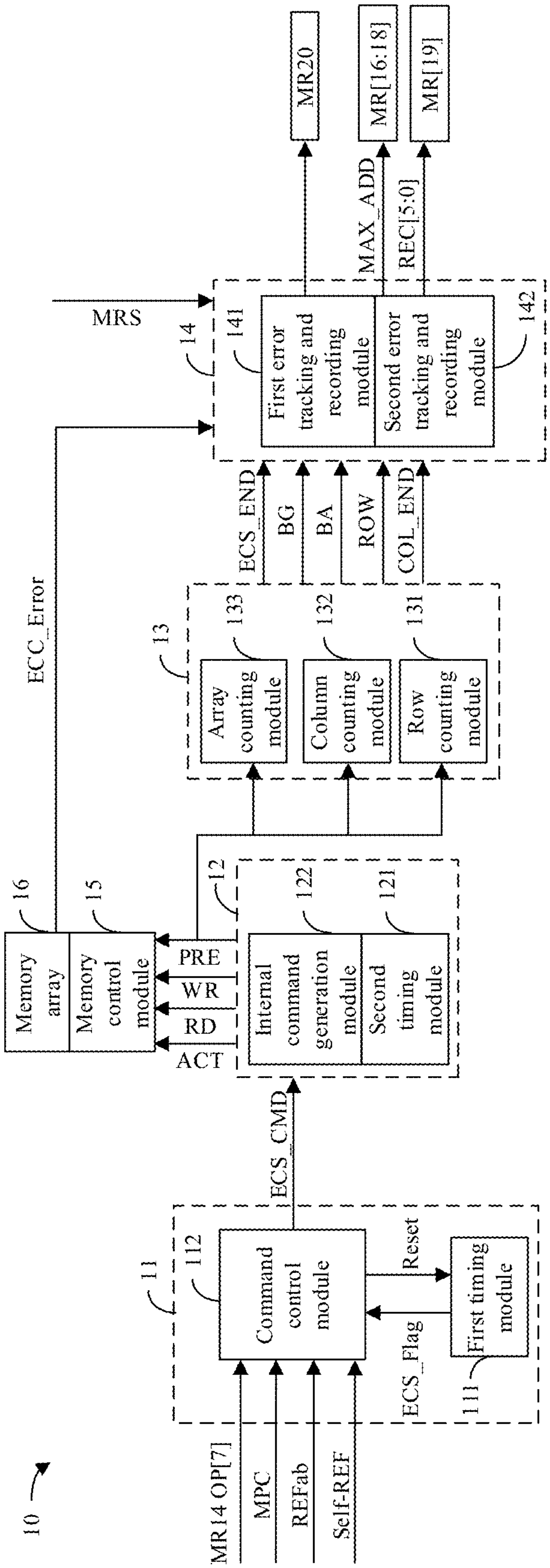
FIG. 9 is a schematic diagram of a specific structure of an ECS circuit according to an embodiment of the present disclosure.

For the error tracking and recording module, on the basis of FIG. 5, refer to FIG. 9, which is a schematic diagram of a specific structure of an ECS circuit 10 according to an embodiment of the present disclosure. As shown in FIG. 9, the error tracking and recording module 14 includes a first error tracking and recording module 141 and a second error tracking and recording module 142.

For the first error tracking and recording module 141, in some embodiments, the first error tracking and recording module 141 is configured to: receive a counting mode signal, and determine that a counting mode of the first error tracking and recording module 141 is a codeword counting mode when the counting mode signal has a first value, or determine that a counting mode of the first error tracking and recording module 141 is a row counting mode when the counting mode signal has a second value.

It should be noted that the first error tracking and recording module 141 (also referred to as ERROR_COUNT, EC) has two working modes: the codeword counting mode and the row counting mode. The two working modes may be switched based on the counting mode signal. The counting mode signal may be MR14 OP[5] (MR14 OP[5] is represented by MRS in FIG. 9). The codeword counting mode is executed when a value of the counting mode signal is the first value, to count a quantity of codeword errors in the memory array. The row counting mode is executed when a value of the counting mode signal is the second value, to count a quantity of rows having at least one codeword error in the memory array.

Herein, the first value may be logic 1 indicating a high level, and the second value may be logic 0 indicating a low level. Alternatively, the first value may be logic 0 indicating a low level, and the second value may be logic 1 indicating a high level. This is not limited.

In this way, a working manner of the first error tracking and recording module is determined by the counting mode signal, so that not only codewords having error information in the memory array can be counted, but also rows having at least one piece of error information in the memory array can be counted, thereby increasing flexibility of recording the error information. In actual application, the working manner may be set based on a requirement.

Further, when the counting mode is the codeword counting mode, as shown in FIG. 9, in some embodiments, the first error tracking and recording module 141 is configured to: receive the error signal, perform codeword counting based on the error signal, determine a first count value when the ECS end signal is received, compare the first count value with a first threshold, and store the first count value when the first count value is greater than or equal to the first threshold. The first count value is configured to represent a quantity of codewords having error information in the memory array.

It should be noted that in this embodiment of the present disclosure, the error information is mainly codeword error information. Therefore, the error information may also be referred to as a codeword error. In the codeword counting mode, the first error tracking and recording module needs to count codewords having error information in the memory array. An error signal (represented by ECC_Error in FIG. 9) is generated each time the memory control module detects a codeword error in the memory array. ECC_Error may be a high-level pulse when a codeword error is detected. Therefore, the first error tracking and recording module may count codewords having error information in the memory array based on ECC_Error. When the ECS end signal (represented by ECS_END in FIG. 9) is received, it indicates that one complete ECS operation has been completed for the memory array. In this case, the first error tracking and recording module stops counting to obtain the first count value. It may be understood that the first count value represents a quantity of codewords having error information in the memory array.

As shown in FIG. 9, a location at which the first count value is stored may be a mode register 20 (MR20). In addition, for the codeword counting mode, the DRAM may ignore a quantity of codeword errors less than the first threshold, that is, the first count value is not to be stored into MR20 when the first count value is less than the first threshold, and the first count value is stored only when the first count value is greater than or equal to the first threshold.

In this embodiment of the present disclosure, the first threshold may be determined by an error threshold count and a storage density of the memory array. The error threshold count (ETC for short) may be set based on a mode register signal MR15 OP[2:0] (MRS may further represent MR15 OP[2:0] in FIG. 9). For example, in DDR5, the ETC is 4 when OP[2:0] is 000B; the ETC is 16 when OP[2:0] is 001B; the ETC is 64 when OP[2:0] is 010B; the ETC is 256 when OP[2:0] is 011B; the ETC is 1024 when OP[2:0] is 100B; the ETC is 4096 when OP[2:0] is 101B. A default setting for the ETC is that the ETC is 256 per memory cell. Herein, one memory cell may represent 1 GB.

It is assumed that the storage density of the memory array is 16 GB, and the ETC is 4. In this case, a quantity of codeword errors per GB is ignored when the quantity is less than 4. For the memory array as a whole, a quantity of codeword errors may be ignored when the quantity is less than $4 \times 16 = 64$. That is, in this example, the first threshold is 64. The first count value is loaded into MR20 for storage if the first count value is greater than or equal to 64. Otherwise, the first count value is not to be stored. Then, the first count value is reset, and counting is performed again when a next complete ECS operation is performed.

In this way, in the codeword counting mode, the first error tracking and recording module may count codewords having error information in the memory array, to obtain the first count value, and store the first count value into the mode register based on the first threshold. This ensures that the first count value is stored for subsequent use only when an amount of error information is excessively large, thereby reducing power consumption and saving storage space.

Further, when the counting mode is the row counting mode, as shown in FIG. 9, in some embodiments, the first error tracking and recording module is configured to: receive the error signal and the column end signal, perform error row counting based on the error signal and the column end signal, determine a second count value when the ECS end signal is received, compare the second count value with a second threshold, and store the second count value when the second count value is greater than the second threshold. The second count value is configured to represent a quantity of rows having at least one piece of error information in the memory array.

It should be noted that in the row counting mode, the first error tracking and recording module needs to count rows having at least one piece of error information in the memory array, that is, the second count value represents a quantity of rows having at least one codeword error.

In a specific implementation, to count rows having at least one piece of error information, the first error tracking and recording module needs to receive ECC_Error and the column end signal (Col_END). For example, the first error tracking and recording module 141 performs counting based on ECC_Error when ECC_Error representing the error information is received, to obtain a row error count value.

When Col_END is received, it indicates that one complete ECS operation has been completed for all storage bits in a current row. If the row error count value of the current row is greater than 0, it indicates that at least one codeword error exists in the current row, and the second count value is increased by 1. Otherwise, the second count value is not increased by 1. Then, the row error count value is reset to zero, and counting is performed again based on ECC_Error. The first error tracking and recording module continues to determine, based on the row error count value, whether the second count value needs to be increased by 1 when next Col_END is received, until ECS_END is received, which indicates that one complete ECS operation has been completed for the memory array. In this case, the first error tracking and recording module stops counting to obtain the second count value.

In another implementation, ECC_Error may alternatively be a pulse signal generated when a row having a codeword error is detected. In this case, the first error tracking and recording module directly counts ECC_Error to obtain the second count value representing a quantity of rows having a codeword error. Alternatively, the first error tracking and recording module may be further connected to a selection module. The selection module selects the codeword counting mode or the row counting mode based on the counting mode signal. In the codeword counting mode, the selection module generates a first pulse signal based on ECC_Error, and the first error tracking and recording module counts the first pulse signal to obtain the first count value. In the row counting module, the selection module generates a second pulse signal based on ECC_Error, and the first error tracking and recording module counts the second pulse signal to obtain the second count value.

A location for storage when the second count value is stored may be the mode register 20 (represented by MR20 in FIG. 9). In addition, for the row counting mode, the DRAM may ignore a quantity of row errors less than the second threshold, that is, the second count value is not to be stored into MR20 when the second count value is less than the second threshold, and the second count value is stored only when the second count value is greater than or equal to the second threshold.

In this embodiment of the present disclosure, it is assumed that the second threshold is 4. The second count value is loaded into MR20 for storage if the second count value is greater than or equal to 4. Otherwise, the second count value is not to be stored. Then, the second count value is reset, and counting is performed again when a next complete ECS operation is performed. In addition, the second threshold may be the foregoing ETC, and a manner of determining the second threshold may be the same as a manner of determining the first threshold.

In this way, in the row counting mode, the first error tracking and recording module may count rows having error information in the memory array, to obtain the second count value, and store the second count value into the mode register based on the second threshold. This ensures that the second count value is stored for subsequent use only when a quantity of rows having error information is excessively large, thereby reducing power consumption and saving storage space.

For the second error tracking and recording module 142, as shown in FIG. 9, in some embodiments, the second error tracking and recording module 142 is configured to: receive the error signal, count error information of the target row based on the error signal and the column end signal, compare a third count value of the target row with a target count value stored in a first register module after the third count value is determined, clear the target count value stored in the first register module if the third count value is greater than the target count value, store the third count value as the target count value in the first register module, continue to perform error counting on a next target row based on the error signal and the column end signal, until the ECS end signal is received, and then determine the target count value stored in the first register module. The third count value is configured to represent a quantity of codewords having error information in the target row.

It should be noted that the second error tracking and recording module 142 (also referred to as an error per row counter, ERROR PER ROW CNT, EPRC) may count codeword errors of each row in the memory array, and store a quantity of codeword errors of a row with a largest quantity of codeword errors and address information of the row. The second error tracking and recording module 142 may count error information of each row based on ECC Error and Col_END. For example, error information of an ith row in the memory array is counted. It is assumed that the memory array includes a total of N rows, and N is an integer greater than 0. In this case, i is an integer greater than 0 and less than or equal to N. When the Col_END signal is received, it indicates that the ECS operation is completed for all storage bits in the ith row. In this case, counting may be completed for the error information of the ith row, and an obtained count value is referred to as the third count value. It may be understood that the third count value represents an amount of error information (namely, a quantity of mistakencodewords) in the ith row.

It should be further noted that, starting from error counting on the first row, if at least one piece of error information exists in the first row, that is, if a third count value of the first row is greater than 0, the third count value corresponding to the first row is stored into the first register module as a target count value. The first register module may be a mode register 19 (represented by MR[19] in FIG. 9). Then, error counting continues to be performed on the second row, and an obtained third count value is compared with the target count value stored in the register. The target count value stored in the first register module is cleared if the third count value corresponding to the second row is greater than the target count value, and the third count value corresponding to the second row is stored into the first register module as a new target count value. In this way, error counting is successively performed. The target count value in the first register module is replaced with a larger third count value whenever the larger third count value appears. In this way, the target count value stored in the first register module is always a third count value corresponding to a row having a largest amount of error information among rows on which counting has been currently performed. In this way, the target count value stored in the first register module is a third count value of a row having a largest amount of error information when the ECS end signal is received.

It may be understood that if the error information does not appear in the first row to an (i−1)th row, and the error information does not appear until the ith row, the ith row has no target count value that can be used for comparison, and the third count value corresponding to the ith row is directly stored into the first register module as the target count value. Alternatively, the second error tracking and recording module is configured to: receive the error signal, count error information of the first row based on the error signal and the column end signal, store a third count value of the first row as a target count value in the first register module after the third count value of the first row is determined, and perform counting on a target row in the foregoing manner after counting is completed for the first row. In this case, the target row represents a row other than the first row. In this case, the third count value may be first stored into the first register module even if the third count value of the first row is 0. For the second row, a corresponding third count value is compared with 0 until a final target count value is determined.

It should be further noted that each time the third count value is stored into the first register module as the target count value, the second error tracking and recording module is further configured to store address information corresponding to the target count value into a second register module when the target count value is stored into the first register module. The address information includes row address information, bank address information, and bank group address information corresponding to the target count value.

The second register module may include a mode register 16, a mode register 17, and a mode register 18, which are represented by MR[16:18] in FIG. 9. It may be understood that address information in the second register module is also replaced with corresponding address information each time the target count value in the first register module is replaced with a larger third count value. In this way, row address information, bank address information, and bank group address information of a row having a largest amount of error information are stored into the second register module when the ECS end signal is received.

Further, in some embodiments, the second error tracking and recording module is further configured to: compare a target count value currently stored in the first register module with a third threshold after the ECS end signal is received, and retain the target count value stored in the first register module and the address information stored in the second register module if the target count value is greater than or equal to the third threshold, or clear the target count value stored in the first register module and the address information stored in the second register module if the target count value is less than the third threshold.

It should be further noted that in this embodiment of the present disclosure, the target count value and the corresponding address information may be stored only when the final target count value is greater than the third threshold. The third threshold is also referred to as a row error threshold count (RETC). In the DDR, a value of the RETC may be fixed as 4. For example, the value of the RETC is equal to 4. The target count value in the first register module is retained if the final target count value is greater than 4, and the address information in the second register module is retained. Otherwise, address information of a current target count value is cleared.

For example, in FIG. 6, if address information corresponding to the final target count value is BG1-BA2-ROW1, it indicates that the target row is the second row ROW1 in a bank BA2 in a bank group BG1 in the memory array. The row address information, the bank address information, and the bank group address information are sent to the error tracking and recording module in a process of performing counting by the address counting module, so that the error tracking and recording module can accurately store the address information corresponding to the target count value.

In this way, the second error tracking and recording module can store, into the mode register based on the third threshold, information about a row having a largest amount of error information. This ensures that the information about the error row is stored for subsequent use only when the amount of error information is excessively large, thereby reducing power consumption and saving storage space.

It should be further noted that in FIG. 9, the target count value is represented by REC[5:0], and is stored into MR19. The address information corresponding to the target count value may be represented by MAX_ADD, including the row address information, the bank address information, and the bank group address information, which are separately stored into the MR[16:18]. ROW and BG/BA that are respectively output by the row counting module and the array counting module are configured to record specific information of a row address having a maximum error count, for storage into a register. That is, in this embodiment of the present disclosure, the error tracking signal is mainly the first count value or the second count value stored in the first error tracking and recording module, and the final target count value and the corresponding address information stored in the second error tracking and recording module. The error tracking signal can be configured to record information such as a quantity of errors in the memory array. In addition, the first count value, the second count value, and the target count value may be encoded through one-hot encoding before storage when the first count value, the second count value, and the target count value are stored.

In short, the error tracking and recording module includes two types of error counters: the first error tracking and recording module (EC) and the second error tracking and recording module (EPRC). The EC module has two modes, which need to be switched based on MR14 OP[5]. The EC module is in the row counting mode when OP[5]=0. In the row counting mode, ECC Error and COL_END are configured to count a quantity of rows having at least one error. The EC module is in the codeword counting mode when OP[5]=1. In the codeword counting mode, the ECC_Error signal is configured to count a quantity of codeword errors. A result of EC is loaded into MR20 based on the ETC when all ECS is completed once, and the EC is reset after the value is transferred to the mode register.

The EPRC module records a row having a largest amount of error information through ECC_Error, BG/BA, and ROW, and records address information MAX_ADD of the row having the largest amount of error information. The address information is loaded into MR[16:18] when all ECS is completed once, and an error count of the row is loaded into MR19 based on the RETC. Herein, data recorded by the EC and the EPRC is not directly loaded into the register, but is loaded into a corresponding register based on the ETC and the RETC when one complete ECS operation is completed.

It should be further noted that a module performing a counting function in this embodiment of the present disclosure may be implemented by a synchronous counter, or may be implemented by an asynchronous counter. This is not specifically limited herein.

This embodiment of the present disclosure provides an ECS circuit. The ECS command signal is generated based on the mode control signal, to perform the ECS operation, so that complete error check and scrub can be performed on a memory. In addition, the error tracking signal may be further generated based on the error signal and the counting end signal after the ECS operation is completed, to record the error information of the ECS operation. Therefore, a location having error information exists in the memory can be quickly found and repair can be performed, thereby finally improving performance of the memory.

Figure 10:
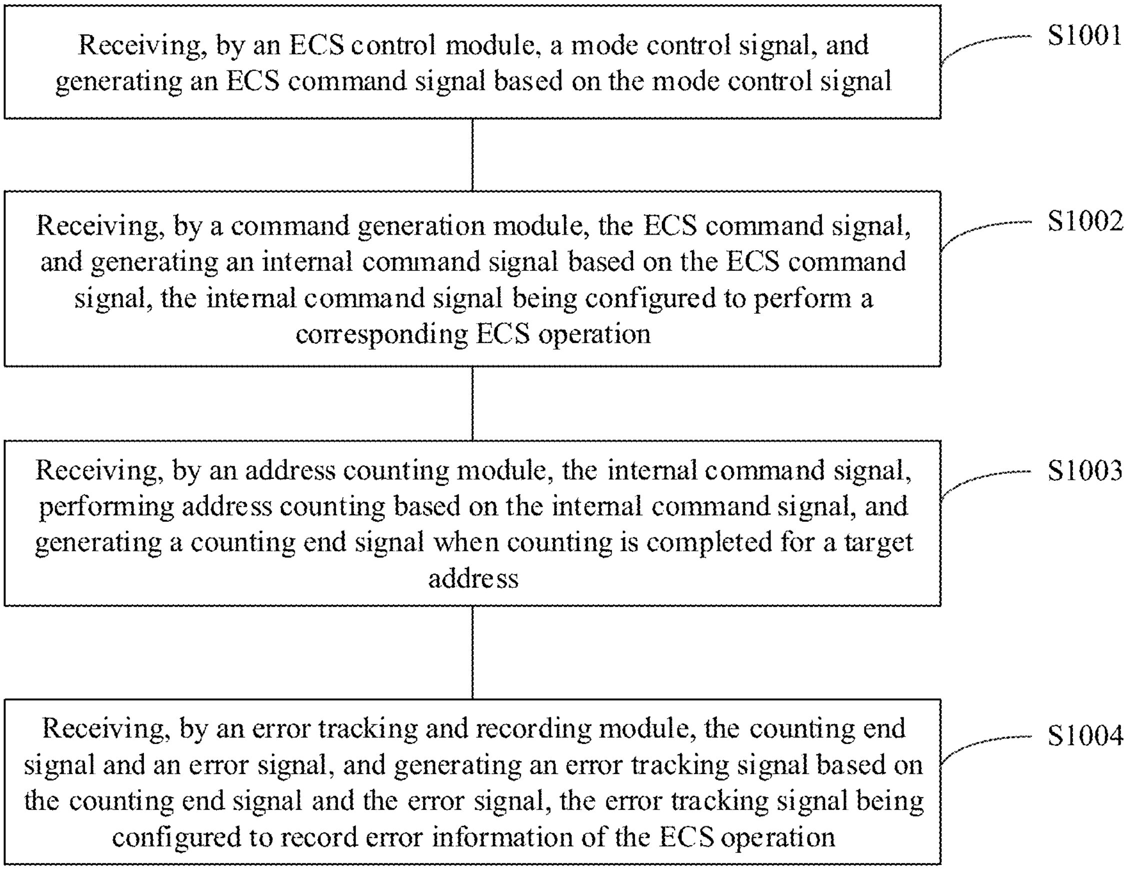
FIG. 10 is a schematic flowchart of an ECS method according to an embodiment of the present disclosure.

In another embodiment of the present disclosure, refer to FIG. 10, which is a schematic flowchart of an ECS method according to an embodiment of the present disclosure. As shown in FIG. 10, the method may include the steps as follows:

In the step of S1001, a mode control signal is received by the ECS control module, and an ECS command signal is generated based on the mode control signal.

In the step of S1002, the ECS command signal is received by the command generation module, and an internal command signal is generated based on the ECS command signal. The internal command signal is configured to perform a corresponding ECS operation.

In the step of S1003, the internal command signal is received by the address counting module, address counting is performed based on the internal command signal, and a counting end signal is generated when counting is completed for a target address.

In the step of S1004, the counting end signal and an error signal are received by the error tracking and recording module, and an error tracking signal is generated based on the counting end signal and the error signal. The error tracking signal is configured to record error information of the ECS operation.

In some embodiments, the mode control signal includes a multi-purpose command MPC signal or a refresh command signal, and that an ECS command signal is generated based on the mode control signal may include the steps as follows:

The ECS command signal is generated based on the MPC signal when the ECS operation is in a manual ECS operation mode; or the ECS command signal is generated based on the refresh command signal when the ECS operation is in an automatic ECS operation mode.

It should be noted that in different ECS operation modes, the ECS operation may be generated based on different command signals. In the automatic ECS operation mode, an automatic ECS operation may be performed based on a refresh signal (REFab), or an automatic ECS operation is performed based on a self refresh signal (Self_REF). In the manual ECS operation mode, the ECS operation may be performed based on a specific MPC signal, or whether the ECS operation is performed during self refresh is determined in combination with a first mode register signal.

In some embodiments, that an ECS command signal is generated based on the mode control signal may include the steps as follows:

An ECS flag signal is generated by a first timing module; and the ECS flag signal is received by the command control module, the refresh command signal is obtained when the ECS flag signal is in a valid state, and the ECS command signal is generated based on the refresh command signal.

In some embodiments, that an ECS flag signal is generated by a first timing module may include the steps as follows:

A first clock signal is received by the first timing module, counting is performed based on the first clock signal, the ECS flag signal is generated, and the ECS flag signal is sent to the command control module. The ECS flag signal is in a valid state when a count value meets a preset condition.

In some embodiments, the method may further include the steps as follows:

The counting is stopped by the first timing module when the ECS flag signal is in a valid state; and a reset signal is generated by the command control module after the ECS command signal is generated based on the refresh command signal, and the reset signal is sent to the first timing module, so that the first timing module starts counting again and controls the ECS flag signal to be in an invalid state.

In some embodiments, the method may further include the steps as follows:

The received refresh command signal is output by the command control module as an internal refresh signal when the ECS flag signal is in an invalid state, so as to perform a refresh operation.

In some embodiments, that an internal command signal is generated based on the ECS command signal may include the steps as follows:

The ECS command signal is received by the internal command generation module, and an active signal, a read command signal, a write command signal, and a precharge signal are successively generated based on a preset timing condition after the ECS command signal is received; and a time interval between the active signal and the read command signal is controlled by a second timing module to meet a first timing condition, a time interval between the read command signal and the write command signal is controlled to meet a second timing condition, and a time interval between the write command signal and the precharge signal is controlled to meet a third timing condition.

The preset timing condition includes the first timing condition, the second timing condition, and the third timing condition.

In some embodiments, the method may further include the steps as follows:

The internal command signal is received by the memory control module, and an ECS operation is performed on the memory array based on the internal command signal; and the error signal is generated if error information is detected when the ECS operation is performed, and the error signal is sent to the error tracking and recording module.

In some embodiments, that address counting is performed based on the internal command signal, and a counting end signal is generated when counting is completed for a target address may include the steps as follows:

The precharge signal is received by the column counting module, column counting is performed on a target row based on the precharge signal, and a column output signal and a column end signal are generated when column counting is completed for the target row;

the precharge signal and the column output signal are received by the row counting module, row counting is performed on a target bank based on the precharge signal and the column output signal, and a row output signal and a row end signal are generated when row counting is completed for the target bank; and the precharge signal and the row output signal are received by the array counting module, bank counting is performed on a target bank group based on the precharge signal and the row output signal, a bank output signal and a bank end signal are generated when the bank counting is completed for the target bank group, bank group counting is performed on the memory array based on the precharge signal and the bank output signal, and a bank group end signal and an ECS end signal are generated when bank group counting is completed for the memory array.

In some embodiments, that the precharge signal and the row output signal are received by the array counting module, bank counting is performed on a target bank group based on the precharge signal and the row output signal, a bank output signal and a bank end signal are generated when the bank counting is completed for the target bank group, bank group counting is performed on the memory array based on the precharge signal and the bank output signal, and a bank group end signal and an ECS end signal are generated when bank group counting is completed for the memory array may include the steps as follows:

The precharge signal and the row output signal are received by the bank counting module, bank counting is performed on the target bank group based on the precharge signal and the row output signal, and the bank output signal and the bank end signal are generated when bank counting is completed for the target bank group; and the precharge signal and the bank output signal are received by the bank group counting module, bank group counting is performed on the memory array based on the precharge signal and the bank output signal, and the bank group end signal and the ECS end signal are generated when bank group counting is completed for the memory array.

In some embodiments, the method may further include the steps as follows:

The column counting module continues to perform column counting on a next target row after the column output signal and the column end signal are generated, until column counting is completed for each row in the memory array;

the row counting module continues to perform row counting on a next target bank after the row output signal and the row end signal are generated, until row counting is completed for each bank in the memory array; and the bank counting module continues to perform bank counting on a next target bank group after the bank output signal and the bank end signal are generated, until bank counting is completed for each bank group in the memory array.

In some embodiments, the method may further include the steps as follows:

A counting mode signal is received by the first error tracking and recording module, and it is determined that a counting mode of the first error tracking and recording module is a codeword counting mode when the counting mode signal has a first value, or it is determined that a counting mode of the first error tracking and recording module is a row counting mode when the counting mode signal has a second value.

In some embodiments, that an error tracking signal is generated based on the counting end signal and the error signal in a codeword counting mode may include the steps as follows:

The error signal is received by the first error tracking and recording module, codeword counting is performed based on the error signal, a first count value is determined when the ECS end signal is received, the first count value is compared with a first threshold, and the first count value is stored when the first count value is greater than or equal to the first threshold. The first count value is configured to represent a quantity of codewords having error information in the memory array.

In some embodiments, that an error tracking signal is generated based on the counting end signal and the error signal in a row counting mode may include the steps as follows:

The error signal and the column end signal are received by the first error tracking and recording module, error row counting is performed based on the error signal and the column end signal, a second count value is determined when the ECS end signal is received, the second count value is compared with a second threshold, and the second count value is stored when the second count value is greater than the second threshold. The second count value is configured to represent a quantity of rows having at least one piece of error information in the memory array.

In some embodiments, that an error tracking signal is generated based on the counting end signal and the error signal may include the steps as follows:

The error signal is received by the second error tracking and recording module, error information of the target row is counted based on the error signal and the column end signal, a third count value of the target row is compared with a target count value stored in a first register module after the third count value is determined, the target count value stored in the first register module is cleared if the third count value is greater than the target count value, the third count value is stored as the target count value in the first register module, error counting continues to be performed on a next target row based on the error signal and the column end signal, until the ECS end signal is received, and then the target count value stored in the first register module is determined. The third count value is configured to represent a quantity of codewords having error information in the target row.

In some embodiments, the method may further include the steps as follows:

Address information corresponding to the target count value is stored into a second register module when the target count value is stored into the first register module. The address information includes row address information, bank address information, and bank group address information corresponding to the target count value.

In some embodiments, the method may further include the steps as follows:

A target count value currently stored in the first register module is compared with a third threshold after the ECS end signal is received, and the target count value stored in the first register module and the address information stored in the second register module are retained if the target count value is greater than or equal to the third threshold, or the target count value stored in the first register module and the address information stored in the second register module are cleared if the target count value is less than the third threshold.

It should be noted that the ECS method provided in this embodiment of the present disclosure is applied to the ECS circuit provided in the foregoing embodiment. For details not disclosed in this embodiment of the present disclosure, refer to the descriptions of the foregoing embodiment.

This embodiment of the present disclosure provides an ECS method. The ECS command signal is generated based on the mode control signal, to perform the ECS operation, so that complete error check and scrub can be performed on a memory. In addition, the error tracking signal may be further generated based on the error signal and the counting end signal after the ECS operation is completed, to record the error information of the ECS operation. Therefore, a location having error information exists in the memory can be quickly found and repair can be performed, thereby finally improving performance of the memory.

Figure 11:
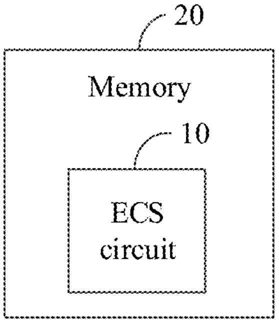
FIG. 11 is a schematic diagram of structural composition of a memory according to an embodiment of the present disclosure.

In still another embodiment of the present disclosure, FIG. 11 is a schematic diagram of structural composition of a memory 20 according to an embodiment of the present disclosure. As shown in FIG. 11, the memory 20 may include the ECS circuit 10 described in any one of the foregoing embodiments.

In some embodiments, the memory 20 may include a DRAM.

It should be noted that this embodiment of the present disclosure provides an overall framework design for a new operation mode, namely, an error check and scrub mode, of a DDR5. In this way, in the manual and automatic ECS operation modes, the ECS command signal is generated through MPC, REFab, and SREF, and then an internal command is automatically generated to perform an error check and scrub operation on a corresponding address. In addition, an error found through the ECS operation is recorded in the EC and the EPRC, and a count of the address counting module is increased after each ECS command ends. Timing control between command generation modules and the timing control module in the ECS design need to ensure that one ECS operation can be completed within tECSc, and complete error check and scrub is performed on the DRAM at least once within 24 hours.

In this embodiment of the present disclosure, the DRAM may not only meet a memory specification such as DDR, DDR2, DDR3, DDR4, DDR5, and DDR6, but also meet a memory specification such as LPDDR, LPDDR2, LPDDR3, LPDDR4, LPDDR5, and LPDDR6. This is not limited herein.

In this embodiment of the present disclosure, the memory 20 includes the ECS circuit 10 described in the foregoing embodiment, so that the ECS operation can be implemented on the memory, thereby improving performance of the memory.

The foregoing descriptions are merely example embodiments of the present disclosure, and are not intended to limit the protection scope of the present disclosure.

It should be noted that in the present disclosure, the terms "include", "comprise", or any other variant thereof are intended to cover non-exclusive inclusion, so that a process, method, article, or apparatus that includes a series of elements includes not only those elements but also other elements that are not expressly listed, or further includes elements inherent to such a process, method, article, or apparatus. An element preceded by "includes a . . . " does not, without more constraints, preclude the presence of additional identical elements in the process, method, article, or apparatus that includes the element.

The sequence numbers of the foregoing embodiments of the present disclosure are merely for the purpose of description, and are not intended to indicate priorities of the embodiments.

The methods disclosed in the several method embodiments provided in the present disclosure may be randomly combined when there is no conflict, to obtain new method embodiments.

The features disclosed in the several product embodiments provided in the present disclosure may be randomly combined when there is no conflict, to obtain new product embodiments.

The features disclosed in the several method or circuit embodiments provided in the present disclosure may be randomly combined when there is no conflict, to obtain new method embodiments or new circuit embodiments.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

In the embodiments of the present disclosure, the ECS command signal is generated based on the mode control signal, to perform the ECS operation, so that complete error check and scrub can be performed on a memory. In addition, the error tracking signal may be further generated based on the error signal and the counting end signal after the ECS operation is completed, to record the error information of the ECS operation. Therefore, a location having error information in the memory can be quickly found and repair can be performed, thereby finally improving performance of the memory.

What is claimed is:

1. An error check and scrub (ECS) circuit, comprising an ECS control module, a command generation module, an address counting module, and an error tracking and recording module, the ECS control module being configured to: receive a mode control signal, and generate an ECS command signal based on the mode control signal;

the command generation module being configured to generate an internal command signal based on the ECS command signal, the internal command signal being configured to perform a corresponding ECS operation;

the address counting module being configured to: perform address counting based on the internal command signal, and generate a counting end signal when counting is completed for a target address; and the error tracking and recording module being configured to: receive an error signal, and generate an error tracking signal based on the counting end signal and the error signal, the error tracking signal being configured to record error information of the ECS operation;

wherein the mode control signal comprises a multi-purpose command MPC signal or a refresh command signal; and the ECS control module is further configured to:

generate the ECS command signal based on the MPC signal when the ECS operation is in a manual ECS operation mode; or generate the ECS command signal based on the refresh command signal when the ECS operation is in an automatic ECS operation mode;

wherein the ECS control module comprises a first timing module and a command control module, the first timing module being configured to generate an ECS flag signal; and the command control module being configured to: receive the ECS flag signal, obtain the refresh command signal when the ECS flag signal is in a valid state, and generate the ECS command signal based on the refresh command signal.

2. The ECS circuit according to claim 1, wherein the first timing module is configured to: receive a first clock signal, perform counting based on the first clock signal, generate the ECS flag signal, and send the ECS flag signal to the command control module, the ECS flag signal being in a valid state when a count value meets a preset condition.

3. The ECS circuit according to claim 2, wherein the first timing module is further configured to stop the counting when the ECS flag signal is in a valid state; and the command control module is further configured to: generate a reset signal after the ECS command signal is generated based on the refresh command signal, and send the reset signal to the first timing module, so that the first timing module starts counting again and controls the ECS flag signal to be in an invalid state.

4. The ECS circuit according to claim 3, wherein the command control module is further configured to output the received refresh command signal as an internal refresh signal when the ECS flag signal is in an invalid state, to perform a refresh operation.

5. An ECS method, applied to the ECS circuit according to claim 1, and comprising:

receiving, by the ECS control module, a mode control signal, and generating an ECS command signal based on the mode control signal;

receiving, by the command generation module, the ECS command signal, and generating an internal command signal based on the ECS command signal, the internal command signal being configured to perform a corresponding ECS operation;

receiving, by the address counting module, the internal command signal, performing address counting based on the internal command signal, and generating a counting end signal when counting is completed for a target address; and receiving, by the error tracking and recording module, the counting end signal and an error signal, and generating an error tracking signal based on the counting end signal and the error signal, the error tracking signal being configured to record error information of the ECS operation.

6. A memory, comprising the ECS circuit according to claim 1.

7. An error check and scrub (ECS) circuit, comprising an ECS control module, a command generation module, an address counting module, and an error tracking and recording module, the ECS control module being configured to: receive a mode control signal, and generate an ECS command signal based on the mode control signal;

the command generation module being configured to generate an internal command signal based on the ECS command signal, the internal command signal being configured to perform a corresponding ECS operation;

the address counting module being configured to: perform address counting based on the internal command signal, and generate a counting end signal when counting is completed for a target address; and the error tracking and recording module being configured to: receive an error signal, and generate an error tracking signal based on the counting end signal and the error signal, the error tracking signal being configured to record error information of the ECS operation;

wherein the command generation module comprises an internal command generation module and a preset timing condition control module, the internal command generation module being configured to successively generate an active signal, a read command signal, a write command signal, and a precharge signal based on a preset timing condition after the ECS command signal is received;

the preset timing condition control module being configured to: control a time interval between the active signal and the read command signal to meet a first timing condition, control a time interval between the read command signal and the write command signal to meet a second timing condition, and control a time interval between the write command signal and the precharge signal to meet a third timing condition; and the preset timing condition comprising the first timing condition, the second timing condition, and the third timing condition.

8. The ECS circuit according to claim 7, wherein the ECS circuit further comprises a memory control module and a memory array, the memory array comprises at least one bank group, the bank group comprises at least one bank, and the bank comprises at least one row and at least one column, the memory control module being configured to: receive the internal command signal, and perform an ECS operation on the memory array based on the internal command signal; and the memory control module being further configured to: generate the error signal if error information is detected when the ECS operation is performed, and send the error signal to the error tracking and recording module.

9. The ECS circuit according to claim 8, wherein the address counting module comprises a column counting module, a row counting module, and an array counting module, the column counting module being configured to: receive the precharge signal, perform column counting on a target row based on the precharge signal, and generate a column output signal and a column end signal when column counting is completed for the target row;

the row counting module being configured to: receive the precharge signal and the column output signal, perform row counting on a target bank based on the precharge signal and the column output signal, and generate a row output signal and a row end signal when row counting is completed for the target bank; and the array counting module being configured to: receive the precharge signal and the row output signal, perform bank counting on a target bank group based on the precharge signal and the row output signal, generate a bank output signal and a bank end signal when the bank counting is completed for the target bank group, perform bank group counting on the memory array based on the precharge signal and the bank output signal, and generate a bank group end signal and an ECS end signal when bank group counting is completed for the memory array.

10. The ECS circuit according to claim 9, wherein the array counting module comprises a bank counting module and a bank group counting module;

the bank counting module being configured to: receive the precharge signal and the row output signal, perform bank counting on the target bank group based on the precharge signal and the row output signal, and generate the bank output signal and the bank end signal when bank counting is completed for the target bank group; and the bank group counting module being configured to: receive the precharge signal and the bank output signal, perform bank group counting on the memory array based on the precharge signal and the bank output signal, and generate the bank group end signal and the ECS end signal when bank group counting is completed for the memory array.

11. The ECS circuit according to claim 10, wherein the error tracking and recording module comprises a first error tracking and recording module, the first error tracking and recording module being configured to: receive a counting mode signal, and determine that a counting mode of the first error tracking and recording module is a codeword counting mode when the counting mode signal has a first value, or determine that a counting mode of the first error tracking and recording module is a row counting mode when the counting mode signal has a second value.

12. The ECS circuit according to claim 11, wherein the first error tracking and recording module is configured to: receive the error signal when the counting mode is the codeword counting mode, perform codeword counting based on the error signal, determine a first count value when the ECS end signal is received, compare the first count value with a first threshold, and store the first count value when the first count value is greater than or equal to the first threshold, the first count value being configured to represent a quantity of codewords having error information in the memory array.

13. The ECS circuit according to claim 11, wherein the first error tracking and recording module is configured to: receive the error signal and the column end signal when the counting mode is the row counting mode, perform error row counting based on the error signal and the column end signal, determine a error row count value when the ECS end signal is received, compare the error row count value with a error row threshold, and store the error row count value when the error row count value is greater than the error row threshold, the error row count value being configured to represent a quantity of rows having at least one piece of error information in the memory array.

14. The ECS circuit according to claim 10, wherein the error tracking and recording module further comprises a error per row counter, the error per row counter being configured to: receive the error signal, count error information of the target row based on the error signal and the column end signal, compare a target row error codeword count value of the target row with a target count value stored in a first register module after the target row error codeword count value is determined, clear the target count value stored in the first register module if the target row error codeword count value is greater than the target count value, store the target row error codeword count value as the target count value in the first register module, continue to perform error counting on a next target row based on the error signal and the column end signal, until the ECS end signal is received, and then determine the target count value stored in the first register module, the target row error codeword count value being configured to represent a quantity of codewords having error information in the target row.

15. The ECS circuit according to claim 14, wherein the error per row counter is further configured to store address information corresponding to the target count value into a second register module when the target count value is stored into the first register module, the address information comprising row address information, bank address information, and bank group address information corresponding to the target count value.

16. The ECS circuit according to claim 15, wherein the error per row counter is further configured to: compare a target count value currently stored in the first register module with a row error threshold count after the ECS end signal is received, and retain the target count value stored in the first register module and the address information stored in the second register module if the target count value is greater than or equal to the row error threshold count, or clear the target count value stored in the first register module and the address information stored in the second register module if the target count value is less than the row error threshold count.

17. The ECS circuit according to claim 9, wherein the column counting module is further configured to continue to perform column counting on a next target row after the column output signal and the column end signal are generated, until column counting is completed for each row in the memory array;

the row counting module is further configured to continue to perform row counting on a next target bank after the row output signal and the row end signal are generated, until row counting is completed for each bank in the memory array; and the array counting module is further configured to continue to perform bank counting on a next target bank group after the bank output signal and the bank end signal are generated, until bank counting is completed for each bank group in the memory array.

18. A memory, comprising the ECS circuit according to claim 7.

19. An ECS method, applied to the ECS circuit according to claim 7, and comprising:

receiving, by the ECS control module, a mode control signal, and generating an ECS command signal based on the mode control signal;

receiving, by the command generation module, the ECS command signal, and generating an internal command signal based on the ECS command signal, the internal command signal being configured to perform a corresponding ECS operation;

receiving, by the address counting module, the internal command signal, performing address counting based on the internal command signal, and generating a counting end signal when counting is completed for a target address; and receiving, by the error tracking and recording module, the counting end signal and an error signal, and generating an error tracking signal based on the counting end signal and the error signal, the error tracking signal being configured to record error information of the ECS operation.

* * * * *